United States Patent [19]
Cannon et al.

[11] 3,950,198
[45] Apr. 13, 1976

[54] FUSION OF VINYL PLASTISOL TO HEAT-SENSITIVE BACKING

[75] Inventors: Joseph A. Cannon; John F. Pysz, Jr.; James T. Renshaw, all of St. Louis, Mo.

[73] Assignee: Monsanto Company, St. Louis, Mo.

[22] Filed: Feb. 28, 1974

[21] Appl. No.: 446,996

Related U.S. Application Data

[62] Division of Ser. No. 188,999, Oct. 19, 1971, now abandoned.

[52] U.S. Cl. ............... 156/79; 156/280; 427/378; 427/389; 427/390
[51] Int. Cl.². D05C 17/00; B29C 27/00; C09J 5/00
[58] Field of Search ............ 156/72, 148, 242, 306, 156/79, 280; 161/62, 67, 159, 403; 117/119.8; 427/378, 389, 390

[56] References Cited
UNITED STATES PATENTS 3,660,320   5/1972   Johnson et al. ............... 260/2.5 P
3,661,691   5/1972   Slosberg ............... 161/67
3,695,987   10/1972  Wisotzky et al. ............... 161/67

Primary Examiner—Michael R. Lusignan
Attorney, Agent, or Firm—Robert E. Wexler

[57] ABSTRACT

Vinyl plastisols are fused to heat-sensitive primary backings and facing yarns integral therewith and expanded thereon by the application of a heating medium in the form of high velocity steam or a high velocity gas. Although the temperature of the heating medium is above the softening point of the heat-sensitive primary backing, the velocity of the heating medium and the angle at which it is directed against the plastisol-coated, heat-sensitive primary backing results in fusion and expansion of the vinyl plastisol on the heat-sensitive primary backing without damage to the backing material or facing materials associated therewith.

11 Claims, No Drawings

FUSION OF VINYL PLASTISOL TO HEAT-SENSITIVE BACKING

Cross Reference to Related Applications

This is a division of application Ser. No. 188,999, filed Oct. 19, 1971, now abandoned.

BACKGROUND OF THE INVENTION

This invention relates to a composition of matter comprising a heat-sensitive primary backing, an integral foam secondary backing for same and a process for producing same. In particular, the invention relates to the application of vinyl foam backing to a heat-sensitive primary backing for carpeting and upholstery materials.

The application of a foam backing to a heat-sensitive material has ordinarily been accomplished by the use of adhesives. Thus, a foam layer is usually attached to a heatsensitive material by coating either the heat-sensitive material or the foam layer, or both, with an adhesive and allowing the adhesive to cure, thus adhering the layers. It has heretofore not been possible to fuse an unblown vinyl plastisol to a heatsensitive material and then heat the composition in order to foam the vinyl plastisol, since the heat at which the fusion and foaming of the plastisol occurs is oftentimes greater than the heat-sensitive backing or the carpet facing material will stand. Thus, in the carpeting industry, it is usual to apply a foamed vinyl backing to a carpet by the use of adhesives.

The use of steam to gel a mechanically frothed rubber latex on the backing web of a carpet is known. Thus, U.S. Pat. No. 3,281,258 discloses a method whereby a frothed latex is applied to a carpet backing and steam is applied against the carpet face in order to gel the latex in such a manner that gelatin proceeds from the backing/latex interface to the top of the latex. The steam temperature is about 90°–115°C. Such temperature is, however, insufficient to fuse and expand a vinyl plastisol containing a chemical blowing agent.

The use of high velocity, heated air to heat thermoplastics preparatory to laminating same is disclosed in U.S. Pat. No. 3,210,227 but it is not contemplated therein to fuse and expand a vinyl plastisol containing a blowing agent to a heat-sensitive backing material.

It has now been found that vinyl plastisols containing chemical blowing agents may be applied directly to a heatsensitive material, such as polypropylene primary carpet backing, and then heated to the temperature necessary to fuse and expand the vinyl plastisol while at the same time not damaging the carpet face or the heat-sensitive backing thereof.

SUMMARY OF THE INVENTION

In accordance with the present invention, it has been found that a vinyl plastisol may be applied directly to a heatsensitive primary backing, such as a heat-sensitive primary carpet or upholstery backing, and subsequently fused and expanded by heating the plastisol with a heating medium, such as steam or a gas, which impinges upon the plastisol layer at high velocities and at an angle such that, although the heat of the heating medium is sufficiently high to damage the heat-sensitive primary backing and the carpet or upholstery face material, such damage does not occur.

DESCRIPTION OF THE PREFERRED EMBODIMENTS

In accordance with the present invention a vinyl plastisol layer is applied directly to a heat-sensitive primary backing material and the carpeting, with its heat-sensitive primary backing and the vinyl plastisol secondary backing, is passed through a heating zone wherein high velocity streams of heating medium impinge upon the plastisol backing. The temperature of the heating medium may reach 180°C. or more, which is sufficient to fuse and expand the vinyl plastisol. Since the only source of heat is the high velocity heating medium applied directly to the plastisol surface, the plastisol insulates the heat-sensitive primary backing and integral facing yarns. As the vinyl plastisol foams, the expanding plastisol further insulates the primary backing and the facing yarns so that no damage thereto occurs from heat.

In the practice of this invention, any conventional vinyl plastisol may be used. As is well known, plastisols are fluent mixtures of particulate vinyl resins and high boiling organic plasticizers therefore which are substantially nonsolvents for the vinyl resin at ordinary temperatures, i.e., not over 35°C., but which are capable of dissolving the resin at high temperatures, i.e., above 35°C. and, more commonly, from 120°–205°C. to form a fused thermoplastic film, layer or coating which, upon cooling to room temperature, results in a set, solid layer, film, coating or sheet.

The vinyl plastisols which are utilized in accordance with this invention are composed of any of the conventional thermoplastic, normally solid, vinyl resins normally used in preparing plastisols. Preferably, the vinyl resin is a polymer of vinyl chloride. The vinyl chloride polymers can either be simple, unmixed homopolymers of vinyl chloride or copolymers or terpolymers in which the simple polymeric structure of polyvinyl chloride is interspersed at intervals with the residues of other ethylenically unsaturated compounds copolymerizable therewith. The essential properties of the polymeric structure of polyvinyl chloride is retained if not more than 40% of a comonomer is copolymerized thereiwth. Suitable comonomers include vinyl halides such as vinyl bromide or vinyl fluoride; vinyl esters such as vinyl acetate, vinyl chloroacetate, vinyl butyrate and fatty acid vinyl esters; vinyl alkyl sulfonates; trichloroethylene; vinyl ethers such as vinyl ethyl ether, vinyl isopropyl ether and vinyl chloroethyl ether; aromatic and cyclic unsaturated compounds such as styrene, the mono- and polychlorostyrenes, coumarone, indene, vinyl naphthalenes, vinyl pyridines, vinyl pyrrole; acrylic acid and its derivatives such as ethyl acrylate, methyl methacrylate, ethyl methacrylate, ethyl chloroacrylate, acrylonitrile and methacrylonitrile; vinylidene compounds such as vinylidene chloride, vinylidene bromide, vinylidene fluorochloride; unsaturated hydrocarbons such as ethylene, propylene and isobutene; allyl compounds such as allyl acetate, allyl chloride and allyl ethyl ether; conjugated and cross-conjugated ethylenically unsaturated compounds, such as butadiere, isoprene, chloroprene, 2,3-dimethylbutyldiene-1,3, piperylene, divinyl ketone and esters such as diethyl maleate and diethyl fumarate.

Resins adaptable for use in formulating vinyl plastisols are commonly referred to as dispersion grade resins. Such resins are available having particle size from 0.02 to about 2 microns.

In the formulation of coating compositions for use in the invention, the resin is uniformly dispersed in a mass of fluid plasticizer. The fluidity of plastisols is influenced in part by the particular resin selected, the plasticizer and the ratio of plasticizer to resin. Plastisols become less fluid as the ratio of plasticizer to resin is reduced. The viscosity of plastisol compositions can also be reduced by the addition of small amounts of a diluent such as benzene, toluene, methyl ethyl ketone, petroleum solvents such as naphtha and similar materials. Plastisols which have been diluted by the addition of such materials are known as "organosols" and are herein included in the term "plastisol". Coating compositions for use in the invention contain from about 40 to about 120 parts plasticizer per 100 parts resin, with about 60 to about 100 parts plasticizer per 100 parts resin being particularly effective for foamable coatings.

The selection of the plasticizer aids in determining the strength and flexibility of the carpet or upholstery material and also in influencing the viscosity and viscosity stability of the composition and the foaming characteristics thereof. The plasticizer or blend of plasticizers is chosen to yield a composition of a desired viscosity and/or foaming characteristic. Any plasticizer which is conventionally used in the preparation of vinyl plastisols may be used in the preparation of the plastisols which are treated in accordance with the present invention. Typical plasticizers include organic dicarboxylic ester plasticizers such as dibutyl phthalate, dicapryl phthalate, dioctyl phthalate, di-2-ethylhexyl phthalate, dibutoxyethyl phthalate, dioctyl phthalate, dipropylene glycol dibenzoate, butyl benzyl sebacate, butyl benzyl phthalate, dibenzyl sebacate, dibenzyl phthalate, diisodecyl phthalate, bis(tridecyl) phthalate, phthalates prepared from mixed $C_{7, 9, 11}$ alcohols, dibutyl adipate, dibutyl sebacate and similar materials. Other types of plasticizers, such as esters of inorganic acids, including tricresyl phosphate, triphenyl phosphate, octyl diphenyl phosphate; alkyd derivatives of rosin; chlorinated paraffins, high molecular weight hydrocarbon condensates and similar materials and mixtures thereof can also be used.

Minor amounts of stabilizers are usually incorporated in the plastisol compositions to reduce the effects of degradation by light and heat. Suitable light stabilizers include resorcinol disalicylate, resorcinol dibenzoate, diphenyl phthalate, phenyl benzoate, o-tolyl benzoate, eugenol, guaiacol, o-nitrophenol, o-nitroaniline, triethyleneglycol salicylate, organic phosphates and complexes of metals such as barium, cadmium, strontium, lead and tin. Suitable heat stabilizers include sulfides and sulfites of aluminum, silver, calcium, cadmium, magnesium, cerium, sodium, strontium, basic lead carbonate, lead acetate, lead naphthenate, tribasic lead sulfate, dibasic lead phthalate, lead stearate, calcium stearate, barium oxide, tetraphenyl tin, dibutyl tin dilaurate, barium-cadmium complexes, barium-cadmium-zinc complexes, barium-zinc complexes and similar materials. Normally the compositions contain about 0.5 to about 5 parts stabilizer per 100 parts resin.

The foamable vinyl plastisols also contain an effective amount of blowing agent. The larger the amount of blowing agent, within practical limits, the greater is the expansion of the foam. About ½ to 10 parts of blowing agent per 100 parts resin is particularly effective for the production of foams of a density which are most desirable as carpet and upholstery materials, although larger amounts may be used. Foam densities of from about 12 to about 40 pounds per cubic foot can be readily obtained.

The blowing agents which are used to provide the foamed plastisols of this invention may be any of those blowing agents well known and readily available to those skilled in the art. Thus typical blowing agents which are used include oxides, bicarbonates, substituted nitros compounds, substituted hydrazides, substituted azo compounds, acid azides, guanyl compounds and compounds having the —N—N— and —N=N— linkages which decompose at elevated temperatures to yield an inert gas high in nitrogen. Typical compounds include azodicarbonamide, azobisisobutyronitrile, diazoaminobenzene, N,N'-dinitrosopentamethylenetetramine, aminoguanidine bicarbonate, benzene sulfonylhydrazide, toluene sulfonylhydrazide, benzazide, phthalazide, isophthalazide, 1,3-diphenyltriazine, buiret, sodium bicarbonate, calcium oxide and similar materials.

It is common practice to add accelerators or catalysts to the plastisol composition to accelerate the decomposition of the blowing agents and/or narrow the decomposition temperature range. Typical accelerators include various metal salts such as dibasic lead phosphite, dibasic lead stearate, dibasic lead phthalate, zinc laurate, zinc oxide, zinc stearate and cadmium octoate. These agents can also serve as stabilizers for the plastisol compositions.

A wide variety of carpet yarns and heat-sensitive primary backings are used to prepare carpets. In the usual manner of preparing carpets a heat-sensitive primary backing is often used. A carpet yarn is sewed or tufted through the primary backing to form a pile or loop which is the face of the carpet. A rubber or resinous secondary backing is then applied to the primary backing to lock the tufted yarn in place and, if required, to provide resilience which may eliminate the necessity for conventional carpet pads.

Typical materials which are used as carpet yarns include natural and synthetic fibers such as cotton, wool, nylon, rayon, polyester, acrylic and similar materials, including blends thereof and modacrylics.

Typical materials which are used for upholstery include cotton, wool and synthetic materials such as nylon, rayon, acrylics and polyesters.

Typical heat-sensitive primary backing materials include natural and synthetic materials such as jute, cotton, burlap, linen, hemp, sisal and synthetic materials such as nylon and poly-propylene.

The conditions which result in fusion and expansion of the plastisol which has been applied to a heat-sensitive primary backing, without damaging the backing or the carpet or upholstery facing, depend on the temperature at which fusion and expansion take place, the "dwell time", the time that the plastisol remains in the heating zone, and the turbulence or air movement within the heating zone. The turbulence is mainly dependent on the velocity of the heating medium issuing from the heating medium inlets and the distance between the surface of the plastisol and the heating medium inlets.

Although vinyl plastisols in general have a fusion temperature of from about 125° to about 200°C., the temperature to which they are exposed in accordance with the invention may be from about 150°C. to about 200°C., the preferred temperature being about 175°–185°C.

The dwell time is somewhat dependent on the plastisol being used, but ordinarily will be from about 3 to 10 minutes, preferably from 5 to 6 minutes.

The velocity of the heating medium which impinges upon the surface of the plastisol must be such as to create a sufficient air movement within the heating zone to prevent gaseous insulation at the interface of the plastisol surface and the gaseous environment of the heating zone. The heating medium velocity must be such that the heat is transferred from the heating medium to the surface of the plastisol. The "cooled" heating medium at the plastisol surface is immediately replaced by heating medium which has not been "cooled". Such abundant supply of heating medium which impinges only on the surface of the plastisol effects a rapid increase in temperature of the plastisol but not of the heat-sensitive primary backing and the facing yarns. Fusion and expansion of the plastisol is achived without damage to the primary backing or facing yarns. Ordinarily, the heating medium velocity is from about 200 feet per minute to about 400 feet per minute, although the velocity may broadly reside in the range of 100 to 4000 feet per minute.

The heating medium which is used in accordance with this invention may be steam, hot air or hot gases such as nitrogen, helium or carbon dioxide. The steam must be under sufficient pressure to raise its temperature to the point that it will fuse the plastisol, i.e., about 185°C.

The distance between the plastisol surface and the heating medium inlets may be from less than one inch to nine or ten inches or more. If the plastisol surface is too close to the heating medium inlets, the high velocity of the heating medium may disturb the plastisol surface. Further, extremely close proximity, i.e., less than 1 inch, may result in less than optimum turbulence and consequent overheating of the heat-sensitive backing material. The most effective distance is from about 1½ to about 6 inches, preferably from about 2 to about 3 inches.

Although most effective air movement is achieved by directing the heating medium against the plastisol surface at an angle of 90°, effective results are attained when the angle of direction is from about 0° to about 90°. Preferably, the angle at which the heating medium is directed against the plastisol surface is from about 45° to about 90°.

Optimum conditions for fusing vinyl plastisols to heat-sensitive primary backings in accordance with this invention are:
Dwell time: 5–6 minutes
Velocity: 400 feet per minute in low velocity ovens to 3500–4000 feet per minute in hieh velocity ovens.
Temperature: 180°C.
Distance: 3–4 inches in low velocity ovens to 9 inches or more in high velocity ovens.
Angle: 90° (normal)

Ideally, the heating is conducted in such a manner that fresh air is allowed to circulate through the heating zone during the fusion period.

The following examples will serve to illustrate certain nonlimiting embodiments within the scope of this invention.

EXAMPLE 1

The following plastisol is formulated:

Example 1

| The following plastisol is formulated: | |
|---|---|
| Ingredient | Parts by Weight |
| Vinyl chloride/vinyl acetate (5%) copolymer | 100 |
| Isobutyl cyclohexyl phthalate | 80 |
| Azodicarbonamide | 5 |
| Ba-Cd-Zn stabilizer | 5 |
| Epoxidized soya oil | 3 |
| Silica aerogel | 4 |
| $TiO_2$ | 5 |

The plastisol is cast on a polypropylene-backed acrylic carpet and fused in an oven adapted to blow a hot air blast from directly above the plastisol surface. The velocity of the hot air is approximately 400 ft/min. Thermocouples are attached to the polypropylene scrim in order to record the temperature thereof during the fusion and blowing process. The results are shown in the table below.

TABLE I

| Temperature | Dwell Time | Distance of Sample from Oven Jet | Remarks |
|---|---|---|---|
| 150° | 10 min. | 3 inches | Good blow |
| 150° | 10 min. | 2 inches | Good blow |
| 150° | 10 min. | 1 inch | Too close to air blast |
| 150° | 5 min. | 2 inches | Fair blow |
| 155° | 5 min. | 2 inches | Fair blow |
| 160° | 5 min. | 2 inches | Good blow |
| 180° | 3 min. | 2 inches | Good blow |
| 200° | 2 min. | 2 inches | Good blow |

The thermocouples attached to the propylene scrim show that, despite the high temperature of fusion and chemical blowing, the temperature of the scrim never exceeds 130°–135°C.

EXAMPLE 2

This example illustrates the time-temperature dependence of vinyl plastisols which are fused and blown in accordance with the invention and also illustrates that the fusion and blowing of the plastisol is accomplished without damage to the heat-sensitive polypropylene primary backing.

A plastisol, prepared as in Example 1, is cast on the polypropylene scrim of an acrylic carpet. The samples are heated at a distance of 3 inches from the air inlets at temperatures of 160° to 200°C. The plasticizer used in Examples 1–16 is butyl benzyl phthalate and the plasticizer used in Examples 17–32 is isobutyl cyclohexyl phthalate. In all other respects the formulation is the same as the formulation of Example 1.

Results are illustrated in the table below:

TABLE II

| Sample No. | Fusion Temp. (°C.) | Fusion Time (Minutes) | Scrim Temp. (°C.) | Foam Weight (lb/sq. yd) | Foam Thickness (Inches) |
|---|---|---|---|---|---|
| 1 | 160 | 6 | 120 | 3.2 | 0.170 |

TABLE II-continued

| Sample No. | Fusion Temp. (°C.) | Fusion Time (Minutes) | Scrim Temp. (°C.) | Foam Weight (lb/sq. yd) | Foam Thickness (Inches) |
|---|---|---|---|---|---|
| 2 | 160 | 7 | 120 | 2.6 | 0.180 |
| 3 | 160 | 8 | 125 | 3.0 | 0.210 |
| 4 | 160 | 9 | 125 | 3.4 | 0.250 |
| 5 | 170 | 5 | 115 | 2.8 | 0.145 |
| 6 | 170 | 6 | 130 | 2.4 | 0.160 |
| 7 | 170 | 7 | 135 | 2.5 | 0.180 |
| 8 | 170 | 8 | 135 | 2.9 | 0.225 |
| 9 | 180 | 2 | 105 | 2.7 | 0.100 |
| 10 | 180 | 3 | 125 | 2.4 | 0.140 |
| 11 | 180 | 4 | 130 | 2.6 | 0.170 |
| 12 | 180 | 5 | 130 | 2.5 | 0.190 |
| 13 | 200 | 1 | 85 | 2.9 | 0.080 |
| 14 | 200 | 2 | 115 | 2.9 | 0.150 |
| 15 | 200 | 3 | 120 | 2.7 | 0.195 |
| 16 | 200 | 4 | 130 | 3.0 | 0.230 |
| 17 | 160 | 6 | 115 | 2.5 | 0.100 |
| 18 | 160 | 7 | 120 | 2.7 | 0.130 |
| 19 | 160 | 8 | 120 | 3.0 | 0.160 |
| 20 | 160 | 9 | 130 | 3.2 | 0.180 |
| 21 | 170 | 5 | 125 | 3.2 | 0.130 |
| 22 | 170 | 6 | 135 | 2.9 | 0.130 |
| 23 | 170 | 7 | 135 | 2.8 | 0.160 |
| 24 | 170 | 8 | 135 | 2.9 | 0.185 |
| 25 | 180 | 2 | 120 | 2.9 | 0.080 |
| 26 | 180 | 3 | 130 | 2.5 | 0.120 |
| 27 | 180 | 4 | 135 | 2.5 | 0.160 |
| 28 | 180 | 5 | 135 | 2.9 | 0.180 |
| 29 | 200 | 1 | 110 | 2.4 | 0.090 |
| 30 | 200 | 2 | 120 | 2.9 | 0.115 |
| 31 | 200 | 3 | 130 | 2.4 | 0.160 |
| 32 | 200 | 4 | 135 | 2.6 | 0.190 |

While the invention has been described hereinabove with regard to certain illustrative embodiments, it is not so limited since many modifications and variations are possible in the light of the above teachings. It is understood therefore that the invention may be practiced otherwise than as specifically described without departing from the spirit and scope of the invention.

The embodiments of the invention in which an exclusive property or privilege is claimed are as follows:

1. The process of preparing a carpet material comprising a carpet facing, a heat-sensitive backing therefor and a vinyl backing therefor which comprises (A) applying a vinyl plastisol to a heat-sensitive backing integral with a carpet facing and (B) heating said material in a heating zone having communication with the atmosphere wherein a heating medium selected from the group consisting of air, gas or steam is projected against the surface of said vinyl plastisol from sources of said heating medium within said heating zone and wherein:
   1. the distance of said material from said heating medium sources is from about 1 inch to about 10 inches;
   2. the temperature within said heating zone is from about 150°C. to about 200°C.;
   3. the dwell time of said material in said heating zone is from about 3 minutes to about 10 minutes;
   4. the velocity at which said heating medium issues from said source is from about 100 to about 4000 feet per minute but below the point at which deformation of the surface of said plastisol occurs;
   5. the angle at which said heating medium is applied to the surface of said plastisol is from about 0° to about 90°.

2. The process of claim 1 wherein said heating medium is air.

3. The process of claim 1 wherein said heating medium is steam.

4. The process of claim 1 wherein the distance of said plastisol from said heating medium source is from about 1½ inches to about 6 inches.

5. The process of claim 4 wherein said distance is from about 2 inches to about 3 inches.

6. The process of claim 1 wherein the temperature within said heating zone is from about 150°C. to about 200°C.

7. The process of claim 6 wherein said temperature is from about 175°C. to about 185°C.

8. The process of claim 1 wherein said dwell time is from about 5 minutes to about 6 minutes.

9. The process of claim 1 wherein said velocity is from about 200 to about 400 feet per minute.

10. The process of claim 1 wherein said heating medium is applied to said plastisol at an angle of 90° or less.

11. The process of claim 10 wherein said angle is from about 45° to about 90°.

* * * * *

UNITED STATES PATENT OFFICE
CERTIFICATE OF CORRECTION

PATENT NO. : 3,950,198
DATED : April 13, 1976
INVENTOR(S) : Joseph A. Cannon; John F. Pysz, Jr.; James T. Renshaw It is certified that error appears in the above-identified patent and that said Letters Patent are hereby corrected as shown below:

Column 1, line 5, "Oct. 19, 1971" should be corrected to read "Oct. 13, 1971".

Column 5, line 65, "hieh" should be corrected to read "high".

Signed and Sealed this

Thirteenth Day of July 1976

[SEAL]

Attest:

RUTH C. MASON
Attesting Officer

C. MARSHALL DANN
Commissioner of Patents and Trademarks